(12) United States Patent
Griffin et al.

(10) Patent No.: US 9,399,749 B2
(45) Date of Patent: Jul. 26, 2016

(54) LIPID EXTRACTION

(71) Applicant: Darling Ingredients Inc., Irving, TX (US)

(72) Inventors: Martin W. Griffin, Covington, KY (US); John L. Crowley, Alexandria, KY (US)

(73) Assignee: Darling Ingredients Inc., Irving, TX (US)

( * ) Notice: Subject to any disclaimer, the term of this patent is extended or adjusted under 35 U.S.C. 154(b) by 0 days.

(21) Appl. No.: 14/459,019

(22) Filed: Aug. 13, 2014

(65) Prior Publication Data

US 2015/0051414 A1    Feb. 19, 2015

Related U.S. Application Data

(60) Provisional application No. 61/865,397, filed on Aug. 13, 2013.

(51) Int. Cl.

| | | |
|---|---|---|
| *C11B 1/10* | (2006.01) | |
| *B01D 11/02* | (2006.01) | |
| *B01D 21/26* | (2006.01) | |
| *F26B 5/00* | (2006.01) | |
| *A23D 9/00* | (2006.01) | |
| *C11B 1/02* | (2006.01) | |
| *B01D 11/00* | (2006.01) | |

(52) U.S. Cl.
CPC ... *C11B 1/10* (2013.01); *A23D 9/00* (2013.01); *B01D 11/02* (2013.01); *B01D 11/0223* (2013.01); *B01D 21/262* (2013.01); *C11B 1/02* (2013.01); *F26B 5/005* (2013.01); *B01D 11/0296* (2013.01); *B01D 2011/002* (2013.01)

(58) Field of Classification Search
None
See application file for complete search history.

(56) References Cited

U.S. PATENT DOCUMENTS

| | | |
|---|---|---|
| 2,503,313 A | 4/1950 | Levin |
| 2,539,544 A | 1/1951 | Levin |
| 2,651,647 A | 9/1953 | Greenfield |
| 2,972,542 A | 2/1961 | Levin |
| 3,535,354 A | 10/1970 | Karnofsky |

(Continued)

FOREIGN PATENT DOCUMENTS

| | | |
|---|---|---|
| EP | 290156 A1 | 11/1988 |
| GB | 905607 A | 9/1962 |

(Continued)

OTHER PUBLICATIONS

Wang, L. et al., Extractin of Lipids from grain sorghum DDG, 2005, Transactions of the ASAE, vol. 48, No. 5, pp. 1881-1888.*

(Continued)

*Primary Examiner* — Yate K Cutliff
(74) *Attorney, Agent, or Firm* — Fish & Richardson P.C.

(57) ABSTRACT

Extracting lipids from a feedstock includes contacting a feedstock including water, lipids, and solid organic matter with an organic solvent to yield a mixture; separating the mixture to yield a solid and a liquid; and desolventizing the solid to yield a solid product and a fluid product. The lipids in the mixture are in the liquid state. The solid product has a lipids content of 20 wt % or less. In some cases, the number-weighted particle size distribution of the solid organic matter has a mean dimension of 1 mm or less, the lipids content of the feedstock is at least 20 wt %, the water content of the feedstock is 10 wt % or less, or a combination thereof.

30 Claims, 3 Drawing Sheets

(56) References Cited

U.S. PATENT DOCUMENTS

| | | | |
|---|---|---|---|
| 3,649,294 | A | 3/1972 | Thijssen |
| 3,687,819 | A | 8/1972 | Levin |
| 3,742,001 | A | 6/1973 | Levin |
| 3,852,260 | A | 12/1974 | Knutsen et al. |
| 3,879,370 | A | 4/1975 | Carpenter et al. |
| 4,192,916 | A | 3/1980 | Melby et al. |
| 4,707,369 | A | 11/1987 | Suresky |
| 5,026,565 | A | 6/1991 | McLachlan et al. |
| 5,552,173 | A | 9/1996 | Singh et al. |
| 5,843,499 | A | 12/1998 | Moreau et al. |
| 6,111,119 | A | 8/2000 | Trout |
| 6,433,146 | B1 | 8/2002 | Cheryan |
| 6,521,768 | B2 | 2/2003 | Beaudoin et al. |
| 7,556,835 | B2 | 7/2009 | Hultin et al. |
| 7,868,195 | B2 | 1/2011 | Fleischer et al. |
| 8,021,709 | B2 | 9/2011 | Hultin et al. |
| 8,227,015 | B2 | 7/2012 | Bruinsma |
| 8,329,036 | B2 | 12/2012 | Kale |
| 2003/0194788 | A1 | 10/2003 | Jakel et al. |
| 2005/0049400 | A1 | 3/2005 | Cheryan |
| 2007/0270600 | A1 | 11/2007 | Chandler et al. |
| 2010/0112187 | A1 | 5/2010 | Crank |
| 2014/0242252 | A1 | 8/2014 | Dubois et al. |
| 2016/0115422 | A1 | 4/2016 | Griffin et al. |

FOREIGN PATENT DOCUMENTS

| | | | | |
|---|---|---|---|---|
| GB | 1127329 | * | 9/1968 | ............... C11B 1/10 |
| GB | 1362810 | A | 8/1974 | |
| GB | 2005526 | A1 | 4/1979 | |
| JP | 58187144 | A | 11/1983 | |
| WO | WO0023546 | A1 | 4/2000 | |
| WO | WO2006106325 | A1 | 10/2006 | |
| WO | WO2007136281 | A1 | 11/2007 | |
| WO | WO2014053180 | A1 | 4/2014 | |
| WO | WO2015023783 | A1 | 2/2015 | |
| WO | WO2016065280 | A1 | 4/2016 | |

OTHER PUBLICATIONS

Neys, International Search Report and Written Opinion for International application No. PCT/US2014/050939, dated Nov. 21, 2014, 8 pages.

Novita LLC, Executive Summary, [online] http://www.novitallc.com/, 2012, 2 pages.

Authorized Officer Aikaterini Drakonaki, International Search Report and Written Opinion for International Application No. PCT/US2015/057149, mailed Jan. 29, 2016, 14 pages.

Authorized Officer Athina Nickitas-Etienne, International International Preliminary Report on Patentability for International application No. PCT/US2014/050939, dated Feb. 25, 2016, 6 pages.

Non-Final Office Action for U.S. Appl. No. 14/921,904, dated Mar. 10, 20016, 8 pages.

* cited by examiner

LIPID EXTRACTION

CROSS-REFERENCE TO RELATED APPLICATION

This application claims priority to U.S. 61/865,397 filed Aug. 13, 2013, and entitled "LIPID EXTRACTION," which is incorporated by reference herein in its entirety.

TECHNICAL FIELD

This disclosure relates to the extraction of lipids from a feedstock including solid organic matter.

BACKGROUND

Processing of feedstocks including plant and animal matter can include solvent extraction to separate lipids and protein. These processes, however, can be ineffective for some feedstocks, such as those including solid organic matter having a small particle size.

SUMMARY

Methods of the present disclosure benefit from a recognition that extracting lipids from feedstocks having solid organic matter with small particle size and particular levels of water, lipids, or both may be achieved by, for example, selecting processing conditions and separation techniques. In doing so, feedstocks may be processed to yield fluid and solid products including lipids and proteins for use in a variety of applications.

In a first general aspect, extracting lipids from a feedstock includes contacting a feedstock with an organic solvent to yield a mixture, separating the mixture to yield a solid and a liquid, and desolventizing the solid to yield a solid product and a fluid product. The feedstock includes water, lipids, and solid organic matter. The lipids in the mixture are in the liquid state. The liquid from the mixture includes some of the lipids from the feedstock. The solid product has a lipids content of 20 wt % or less.

In a second general aspect, extracting lipids from a feedstock includes contacting a feedstock with an organic solvent to yield a mixture, separating the mixture to yield a solid and a liquid, and desolventizing the solid to yield a solid product and a fluid product. The feedstock includes water, lipids, and solid organic matter. The lipids in the mixture are in the liquid state. A number-weighted particle size distribution of the solid organic matter in the feedstock has a mean dimension of 1 mm or less. The liquid from the mixture includes some of the lipids from the feedstock. The solid product has a lipids content of 20 wt % or less.

In a third general aspect, extracting lipids from a feedstock includes contacting a feedstock with an organic solvent to yield a mixture, separating the mixture to yield a solid and a liquid, and desolventizing the solid to yield a solid product and a fluid product. The feedstock includes water, lipids, and solid organic matter. The lipids content of the feedstock is at least 10 wt %, the water content of the feedstock is 10 wt % or less, and the lipids in the mixture are in the liquid state. The solid product has a lipids content of 20 wt % or less.

Implementations of the first through the third general aspects may independently include one or more of the following features in any combination.

The solid organic matter may include solid animal matter, solid plant matter, algae, or a combination thereof. The number-weighted particle size distribution of the solid organic matter may have a mean dimension of 1 mm or less. In some cases, the number-weighted particle size distribution of the solid organic matter has a mean maximum dimension of 1 mm or less. The feedstock may have a lipids content of at least 20 wt %, at least 30 wt %, at least 40 wt %, at least 50 wt %, at least 60 wt %, or at least 70 wt %. In some cases, the water content of the feedstock is 10 wt % or less.

In some cases, the feedstock is treated before contacting the feedstock with the organic solvent. Treating the feedstock may include combining additional lipids with the feedstock, removing water from the feedstock to reduce a water content of the feedstock to less than 10 wt %, or both. In certain cases, the mixture is treated before separating the mixture to yield a solid and a liquid. In one example, treating the mixture includes combining additional lipids with the mixture. In another example, treating the mixture includes heating the mixture to a temperature of at least 120° F. (50° C.) or a temperature of at least 150° F. (65° C.), thereby killing bacteria (e.g., bacteria of the genus *Salmonella*) in the mixture.

The organic solvent may include one or more alkanes (e.g., hexane or heptane), one or more isomers thereof, or any combination of alkanes and their isomers. The ratio of the mass of the organic solvent to the mass of the feedstock may be at least 1:1.

Separating the mixture may include subjecting the mixture to a rotational force produced by a centripetal acceleration of at least 2000 g, where g is the acceleration due to gravity. In some instances, separating the mixture includes subjecting the mixture to a rotational force produced by a centripetal acceleration of at least 2000 g to yield a first solid and a first liquid, combining the first solid with a second solvent to yield a second mixture, and subjecting the second mixture to a rotational force produced by a centripetal acceleration of at least 2000 g to yield a second solid and a second liquid. Separating the mixture or the second mixture may occur in the absence of rotational force or screening. Contacting the feedstock with the organic solvent and separating the mixture may occur continuously, simultaneously, or both. In some cases, contacting the feedstock with the organic solvent and separating the mixture includes flowing the organic solvent in a first direction with respect to the feedstock while the feedstock moves in the opposite direction.

The liquid may include lipids. In some cases, desolventizing the solid includes drying (e.g., heating) the solid. Before desolventizing the solid, a second organic solvent may be combined with the solid to yield a second mixture. The second mixture may be separated to yield a second solid and a second liquid. The second solid may be desolventized to yield the solid product and the fluid product.

The solid product may have a lipids content of 10 wt % or less or 5 wt % or less. The fluid product may be a liquid, a gas, or a vapor. The solid product may have a solvent content of less than 1 wt % or less than 500 ppm. The fluid product may be combined with the liquid from the mixture to yield a solvent mixture. The solvent mixture may be combined with the feedstock. In one example, contacting the feedstock with the solvent includes contacting the feedstock with the solvent mixture. Lipids may be recovered from the liquid, the fluid product, the solvent mixture, or any combination thereof.

The number-weighted particle size distribution of the solid product may have a mean dimension of 1 mm or less. In certain cases, the number-weighted particle size distribution of the solid product has a mean maximum dimension of 1 mm or less.

A fourth general aspect includes lipids recovered by any of the above general aspects in combination with any one or more of the above implementations.

A fifth general aspect includes the solid product formed by any of the above general aspects in combination with any one or more of the above implementations.

In a sixth general aspect, extracting lipids from a feedstock includes contacting a feedstock with a first organic solvent to yield a first mixture. The feedstock includes water, lipids, and solid organic matter. A number-weighted particle size distribution of the solid organic matter has a mean dimension of 1 mm or less, and the lipids in the first mixture are in the liquid state. The first mixture is separated to yield a first solid and a first liquid. The first liquid includes some of the lipids from the feedstock. The first solid is contacted with a second organic solvent to yield a second mixture, and the second mixture is separated to yield a second solid and a second liquid. The second solid is desolventized to yield a solid product and a fluid product. The solid product has a lipids content of 20 wt % or less.

In a seventh general aspect, extracting lipids from a feedstock includes contacting a feedstock with a first organic solvent with to yield a first mixture. The feedstock includes water, lipids, and solid organic matter. The lipids in the first mixture are in the liquid state, the lipids content of the feedstock is at least 10 wt %, and the water content of the feedstock is 10 wt % or less. The first mixture is separated to yield a first solid and a first liquid. The first liquid includes some of the lipids from the feedstock. The first solid is contacted with a second organic solvent to yield a second mixture. The second mixture is separated to yield a second solid and a second liquid. The second solid is desolventized to yield a solid product and a fluid product. The solid product has a lipids content of 20 wt % or less.

Implementations of the sixth and seventh general aspects may independently include one or more of the following features in any combination.

In some cases, the solid organic matter includes solid animal matter, solid plant matter, algae, or a combination thereof. The number-weighted particle size distribution of the solid organic matter may have a mean maximum dimension of 1 mm or less. The water content of the feedstock may be 10 wt % or less. In certain cases, the lipids content of the feedstock is at least 10 wt %, at least 20 wt %, at least 30 wt %, at least 40 wt %, at least 50 wt %, at least 60 wt %, or at least 70 wt %.

The feedstock may be treated before contacting the feedstock with the first organic solvent. Treating the feedstock may include removing water from the feedstock to reduce a water content of the feedstock to less than 10 wt %, combining additional lipids with the feedstock before contacting the feedstock with the first organic solvent, or a combination thereof.

The first organic solvent and the second organic solvent may each independently include one or more alkanes (e.g., hexane or heptane), one or more isomers thereof, or any combination of alkanes and their isomers. The ratio of the mass of the first organic solvent to the mass of the feedstock is at least 1:1.

The first mixture may be treated before separating the first mixture into the first liquid and the first solid. In one example, treating the first mixture includes combining additional lipids with the first mixture before separating the first mixture. In another example, treating the first mixture includes heating the first mixture to a temperature of at least 120° F. (50° C.) or a temperature of at least 150° F. (65° C.), thereby killing bacteria (e.g., bacteria of the genus *Salmonella*) in the first mixture.

Separating the first mixture may include subjecting the first mixture to a rotational force produced by a centripetal acceleration of at least 2000 g. Separating the second mixture may include subjecting the second mixture to a rotational force produced by a centripetal acceleration of at least 2000 g. In some cases, contacting the first solid with the second organic solvent to yield the second mixture and separating the second mixture to yield the second solid and the second liquid occur continuously, simultaneously, or both.

In some cases, desolventizing the second solid includes drying (e.g., heating) the second solid. The fluid product may be in the form of a liquid, a gas, or a vapor. Solvent may be recovered from the fluid product. The fluid product may include lipids, and some of the lipids may be recovered from the fluid product. In some cases, the fluid product and the first liquid are combined to yield a solvent mixture, and solvent, lipids, or both may be recovered from the solvent mixture.

The solid product may have a lipids content of 10 wt % or less or 5 wt % or less. The solid product may have a solvent content of less than 1 wt % or less than 500 ppm. The number-weighted particle size distribution of the solid product may have a mean dimension of 1 mm or less. In some cases, the number-weighted particle size distribution of the solid product has a mean maximum dimension of 1 mm or less.

An eighth general aspect includes lipids recovered by the sixth or seventh general aspects in combination with any one or more of the above implementations.

A ninth general aspect includes the solid product by the sixth or seventh general aspects in combination with any one or more of the above implementations.

The details of one or more implementations of the subject matter described in the specification are set forth in the accompanying drawings and the description below. Other features, aspects, and advantages of the subject matter will become apparent from the description, the drawings, and the claims.

DETAILED DESCRIPTION

Figure 1:
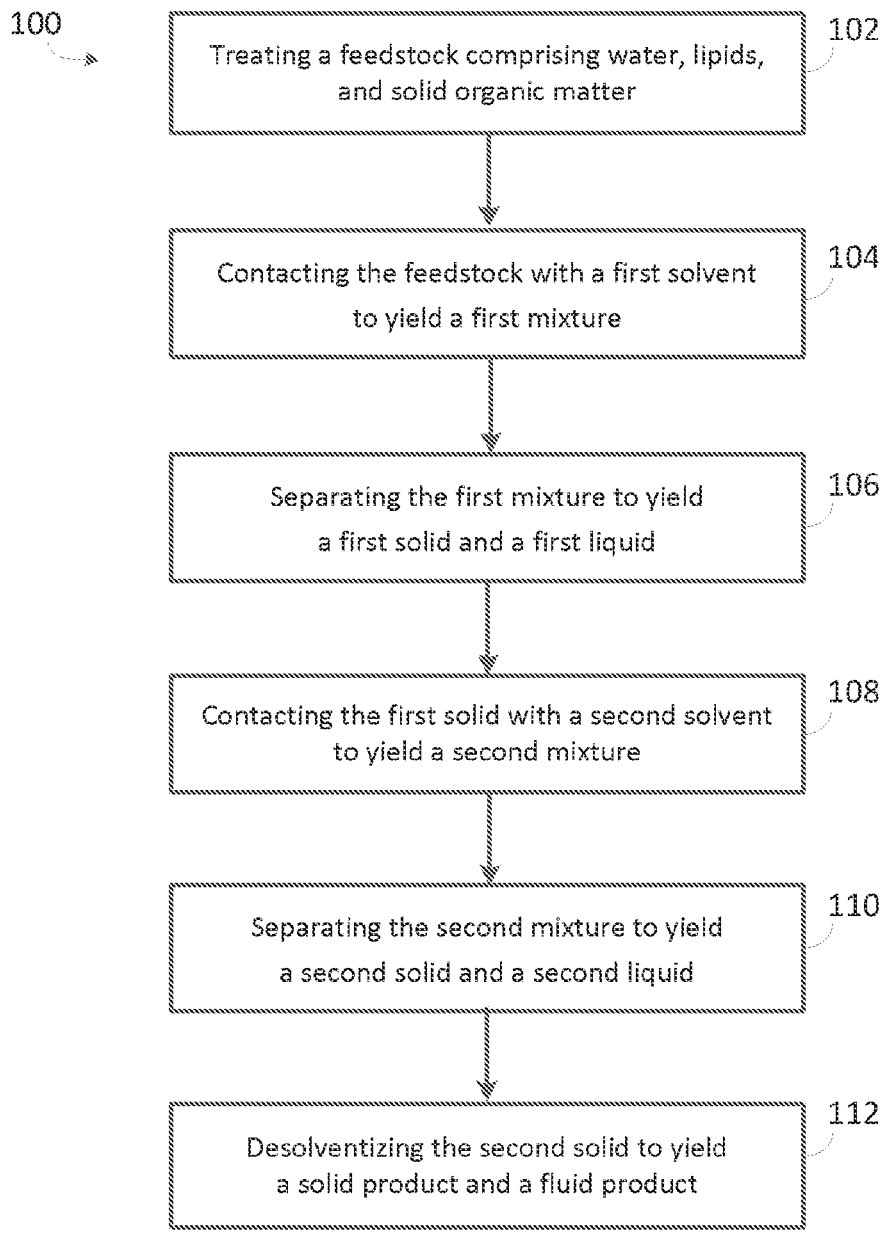
FIG. 1 depicts a first process for extracting lipids from a feedstock.

FIG. 1 depicts a process 100 for extracting lipids from a feedstock including water, lipids, and solid organic matter. The solid organic matter can be plant matter, animal matter, algae, or a combination thereof. Examples of plant matter include legumes and grains. Animal matter includes all animal tissue such as bone, muscle, and fat, including animal tissue found in waste water from a slaughterhouse. Examples of algae include brown algae, red algae, blue-green algae, and green algae. The algae may vary in size from giant kelps to micron-size or unicellular algae. In some cases, the water content of the feedstock is 10 wt % or less or 5 wt % or less (e.g., a water content of 0 wt % to 10 wt %, 0 wt % to 5 wt %, or 5 wt % to 10 wt %). In certain cases, the lipids content of the feedstock is at least 10 wt %, at least 20 wt %, at least 30 wt %, at least 40 wt %, at least 50 wt %, at least 60 wt %, or at least 70 wt % (e.g., a lipids content of 10 wt % to 70 wt %, 10 wt % to 40 wt %, or 10 wt % to 20 wt %).

Particle sizes described herein may be assessed, for example, via laser diffraction particle size analysis. A number-weighted particle size distribution of the solid organic matter may have a mean dimension of 1 mm or less (e.g., 900

μm or less, 800 μm or less, 700 μm or less, 600 μm or less, 500 μm or less, 400 μm or less, 300 μm or less, 200 μm or less, or 100 μm or less). The number-weighted particle size distribution of the solid organic matter may have a mean dimension of at least 0.5 μm. In some cases, the mean dimension of the number-weighted particle size distribution is in a range between 0.5 μm and 1 mm, 0.5 μm and 750 μm, 0.5 μm and 500 μm, or 0.5 μm and 100 μm. In certain cases, the number-weighted particle size distribution of the solid organic matter has a mean maximum dimension of 1 mm or less (e.g., 900 μm or less, 800 μm or less, 700 μm or less, 600 μm or less, 500 μm or less, 400 μm or less, 300 μm or less, 200 μm or less, or 100 μm or less). The number-weighted particle size distribution of the solid organic matter may have a mean maximum dimension of at least 0.5 μm. In some cases, the mean maximum dimension of the number-weighted particle size distribution is in a range between 0.5 μm and 1 mm, 0.5 μm and 750 μm, 0.5 μm and 500 μm, or 0.5 μm and 100 μm.

In 102, a feedstock may be treated to yield a treated feedstock. Treating a feedstock may change its physical characteristics, chemical characteristics, or both. For simplicity, "treated feedstock" is referred to herein as "feedstock." In one example, treating a feedstock includes removing water from a feedstock having a water content of at least 10 wt %, at least 20 wt %, at least 30 wt %, at least 40 wt %, at least 50 wt %, at least 60 wt %, at least 70 wt %, at least 80 wt %, or at least 90 wt % (e.g., a water content of 10 wt % to 95 wt %, 10 wt % to 40 wt %, or 10 wt % to 20 wt %, 70 wt % to 95 wt %, or 80 wt % to 90 wt %) to yield a feedstock having a water content of 10 wt % or less (e.g., 9 wt % or less, 8 wt % or less, 7 wt % or less, 6 wt % or less, 5 wt % or less, 4 wt % or less, 3 wt % or less, 2 wt % or less, or 1 wt % or less). Treating a feedstock may include heating the feedstock. In one example, a feedstock is heated to liquefy lipids in the feedstock. In another example, a feedstock is heated to a temperature of at least 120° F. (50° C.) or at least 150° F. (65° C.), thereby killing bacteria (e.g., bacteria of the genus *Salmonella*) in the feedstock. In some cases, treating a feedstock includes one or more of screening, chopping, comminuting, or otherwise reducing the particle size of the solid organic matter in the feedstock. In certain cases, treating the feedstock includes adding lipids to the feedstock to increase the total lipids content of the feedstock. In one example, lipids are added to a feedstock with a lipids content of less than 10 wt %. In another example, lipids are added to a feedstock to increase the lipids content of the feedstock to 10 wt % or greater. The feedstock, including the added lipids if present, may also be blended (e.g., agitated, mixed, stirred, or the like).

In 104, the feedstock is contacted with a first solvent to yield a first mixture. Contacting the feedstock with the first solvent may include combining the feedstock and the solvent to yield a first mixture. Lipids in the first mixture are typically in the liquid state. In some cases, the first mixture has a lipids content in the range of 30 wt % to 70 wt % (e.g., 35 wt % to 65 wt %, 30 wt % to 40 wt %, or 35 wt %). The first solvent is typically an organic solvent, such as an alkane or a mixture that includes one or more alkanes (e.g., n-hexane or any isomer or mixture thereof, such as isohexane, neohexane, or the like; n-heptane or any isomer or mixture thereof, or the like). In some cases, the first solvent is a combination of one or more solvents or isomers. The solvent may be combined with the feedstock in a mass ratio of solvent to feedstock in the range of 1:1 to 5:1 (e.g., 1.5:1 to 2.5:1, or 2:1). The solvent may be from any source (e.g., fresh solvent, reclaimed solvent, or a solvent mixture including solvent and lipids).

The first mixture may be agitated (e.g., the contacting may occur in an agitated vessel). In some cases, operation 104 occurs in a mixing stage or a vessel that agitates the first mixture. In certain cases, operation 104 includes treating the first mixture. Treating the first mixture may include, for example, heating the first mixture. In one example, the first mixture is heated to a temperature of at least 120° F. (50° C.) or at least 150° F. (65° C.), thereby killing bacteria (e.g., bacteria of the genus *Salmonella*) in the first mixture.

In 106, the first mixture is separated to yield a first solid and a first liquid. Separation may occur, for example, in a vertical centrifuge, a horizontal centrifuge, a pusher, a decanter, an extractor, a separator, or the like. In some cases, separating the first mixture includes subjecting the first mixture to a rotational force produced by a centripetal acceleration of at least 2000 g, where g is the acceleration due to gravity.

In 108, the first solid is contacted with a second solvent to yield a second mixture. The second solvent is typically an organic solvent, such as an alkane or a mixture that includes one or more alkanes (e.g., n-hexane or any isomer or mixture thereof, such as isohexane, neohexane, or the like; n-heptane or any isomer or mixture thereof, or the like). In some cases, the second solvent is a mixture of one or more solvents or isomers. The second solvent may be combined with the first solid in a mass ratio of solvent to first solid in the range of 1:1 to 5:1 (e.g., 1.5:1 to 2.5:1, or 2:1). The solvent can be from any source (e.g., fresh solvent, reclaimed solvent, or a solvent mixture including solvent and lipids). The second solvent may be the same or different as the first solvent. In some examples, the mass ratio of the second solvent to first solid in the second mixture is in the range of 1:1 to 10:1 (e.g., 2:1 to 5:1 or 3:1).

The second mixture may be agitated (e.g., the contacting may occur in an agitated vessel). In some cases, operation 108 occurs in a mixing stage or a vessel that agitates the second mixture. In one example, contacting the feedstock in 104 and contacting the first solid in 108 are similar processes involving apparatuses that operate by similar principles. In another example, contacting the feedstock in 104 and contacting the first solid in 108 are different processes involving apparatuses that operate by different principles.

In certain cases, operation 108 includes treating the second mixture. Treating the second mixture may include, for example, heating the second mixture. In one example, the second mixture is heated to a temperature of at least 120° F. (50° C.) or at least 150° F. (65° C.), thereby killing bacteria (e.g., bacteria of the genus *Salmonella*) in the second mixture.

In 110, the second mixture is separated to yield a second solid and a second liquid. Separation may occur, for example, in a vertical centrifuge, a horizontal centrifuge, a pusher, a decanter, an extractor, a separator, or the like. In some cases, separating the second mixture includes subjecting the second mixture to a rotational force produced by a centripetal acceleration of at least 2000 g. In some cases, 108 and 110 occur in different vessels. In certain cases, 108 and 110 occur continuously, simultaneously, or both in the same vessel. In one example, separating the first mixture in 106 and separating the second mixture in 110 are similar processes (e.g., involving rotational force). In another example, separating the first mixture in 106 and separating the second mixture in 110 are different processes (e.g., 106 or 110 involves the use of rotational force, and the other does not).

The second liquid may be recycled. In one example, the first solvent in 104 includes all or a portion of the second liquid (e.g., the second liquid is combined with fresh solvent to yield the first solvent, or the second liquid and the first solvent are provided to the feedstock separately).

In 112, the second solid is desolventized to yield a solid product and a fluid product. The fluid product may be in the form of a liquid, a gas, a vapor, or a combination thereof. The fluid product includes solvent (e.g., the first solvent, the second solvent, or a combination thereof). In some cases, the fluid product includes water or water vapor, lipids, particles of the solid product, or any combination thereof. In certain cases, desolventizing includes drying (e.g., heating) the second solid. Desolventizing the second solid may include removing solvent from the second solid to yield a solid product with less than 1 wt % solvent (e.g., less than 500 ppm solvent or less than 250 ppm solvent). In one example, the second solid is desolventized by heating the second solid to vaporize residual solvent in the second solid, thereby forming the fluid product in the form of a vapor. The solid product may be a meal including protein. In one example, at least some of the fluid product is provided to an evaporator/condensing system, such that the residual solvent is recovered for re-use. Lipids present in the fluid product may be recovered separately. In some cases, the fluid product is combined with the first liquid to yield a second solvent mixture. Solvent and lipids may be recovered from the second solvent mixture. Solvent recovered from the second solvent mixture may be used as part of the first solvent, the second solvent, or both.

The solid product has a lipids content of 20 wt % or less (e.g., 15 wt % or less, 10 wt % or less, 9 wt % or less, 8 wt % or less, 7 wt % or less, 6 wt % or less, 5 wt % or less, 4 wt % or less, 3 wt % or less, 2 wt % or less, or 1 wt % or less). In some examples, the lipids content is in a range between 0 wt % and 20 wt %, 0 wt % and 15 wt %, 0 wt % and 10 wt %, or 0 wt % and 5 wt %). In some cases, the number-weighted particle size distribution of the solid product has a mean dimension of 1 mm or less (e.g., 900 µm or less, 800 µm or less, 700 µm or less, 600 µm or less, 500 µm or less, 400 µm or less, 300 µm or less, 200 µm or less, or 100 µm or less). The number-weighted particle size distribution of the solid product may have a mean dimension of at least 0.5 µm. In some cases, the mean dimension of the number-weighted particle size distribution is in a range between 0.5 µm and 1 mm, 0.5 µm and 750 µm, 0.5 µm and 500 µm, or 0.5 µm and 100 µm. In certain cases, the number-weighted particle size distribution of the product has a mean maximum dimension of 1 mm or less (e.g., 900 µm or less, 800 µm or less, 700 µm or less, 600 µm or less, 500 µm or less, 400 µm or less, 300 µm or less, 200 µm or less, or 100 µm or less). The number-weighted particle size distribution of the solid product may have a mean maximum dimension of at least 0.5 µm. In some cases, the mean maximum dimension of the number-weighted particle size distribution is in a range between 0.5 µm and 1 mm, 0.5 µm and 750 µm, 0.5 µm and 500 µm, or 0.5 µm and 100 µm.

In some cases, one or more of the operations in FIG. 1 may be omitted, based on properties of the feedstock (e.g., particle size, lipids content, water content), properties of the first solid, the second solid, or the solid product (e.g., particle size, lipids content, water content), or a combination thereof. That is, one or more of the operations in FIG. 1 may be optional. In one example, 102 is omitted. In another example, 108 and 110 are omitted, and the first solid is desolventized in 112 to yield the solid product and the fluid product. In certain cases, one or more of the operations depicted in FIG. 1 is replaced or combined with another operation, the order of one or more the operations is interchanged, two or more operations occur simultaneously or continuously, or any combination thereof.

Figure 2:
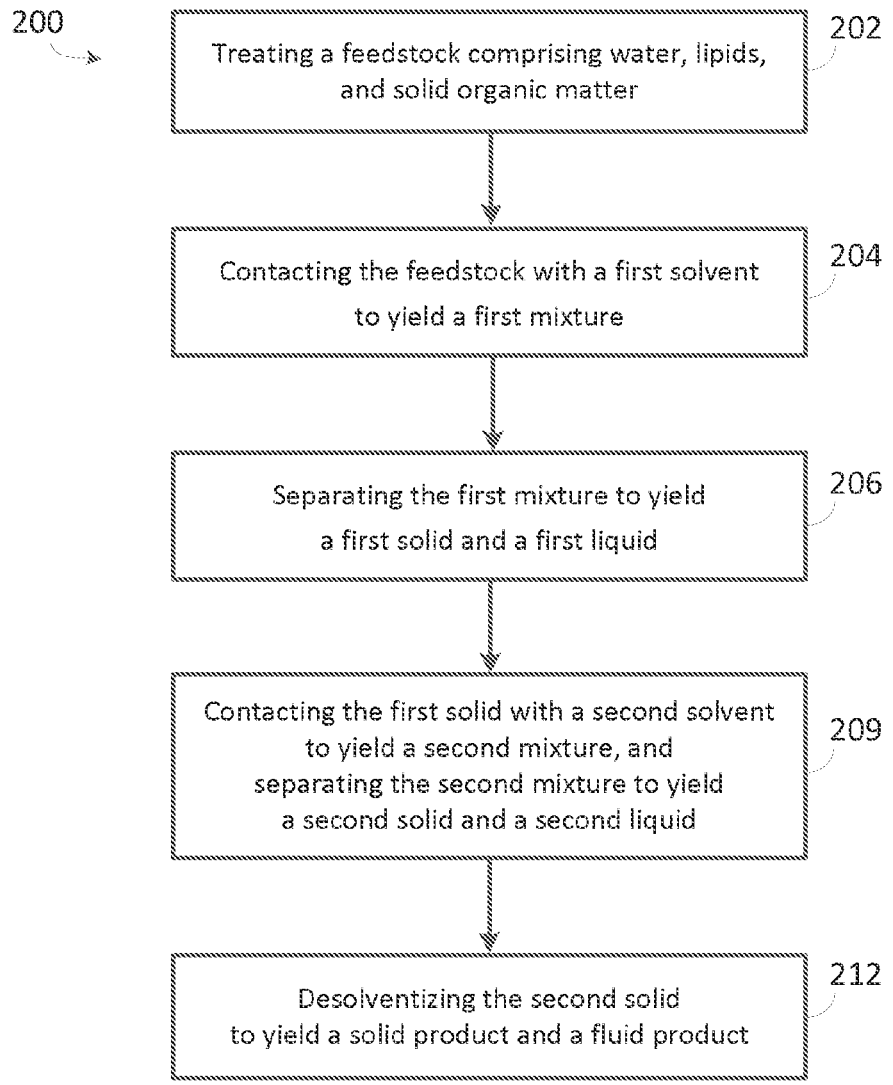
FIG. 2 depicts a second process for extracting lipids from a feedstock.

FIG. 2 depicts a process 200 for extracting lipids from a feedstock including water, lipids, and solid organic matter. Process 200 is an example of a process in which two operations in process 100 are combined. Operations 202, 204, 206, and 212 in process 200 correspond to operations 102, 104, 106, and 112 of process 100, respectively, and operation 209 corresponds to a combination of operations 108 and 110 of process 100. In 209, the first solid from 206 is contacted with a second solvent to yield a second mixture, and the second mixture is separated to yield a second solid and a second liquid. Operation 209 may be a continuous process that takes place in a single apparatus (e.g., an extractor) and may be achieved without the use of a centrifuge or a screen. In some cases, contacting the first solid with the second solvent and separating the second mixture occur simultaneously in a single apparatus. In one example, the apparatus is an extractor that includes a conveyor system used to contact the first solid with a second solvent to yield a second mixture while continuously separating the second mixture to yield a second solid and a second liquid. The conveyor system draws the first solid along a surface in a first direction, and the first solid is immersed in the second solvent flowing from the opposite direction. Lipids are extracted from the first solid throughout the process as contacting (e.g., mixing) occurs in a "countercurrent" arrangement. In this process, the second solid is discharged from one end of the extractor, while the second liquid (i.e., a solvent mixture including solvent and lipids extracted from the first solid) is discharged from the opposite end of the extractor.

Figure 3:
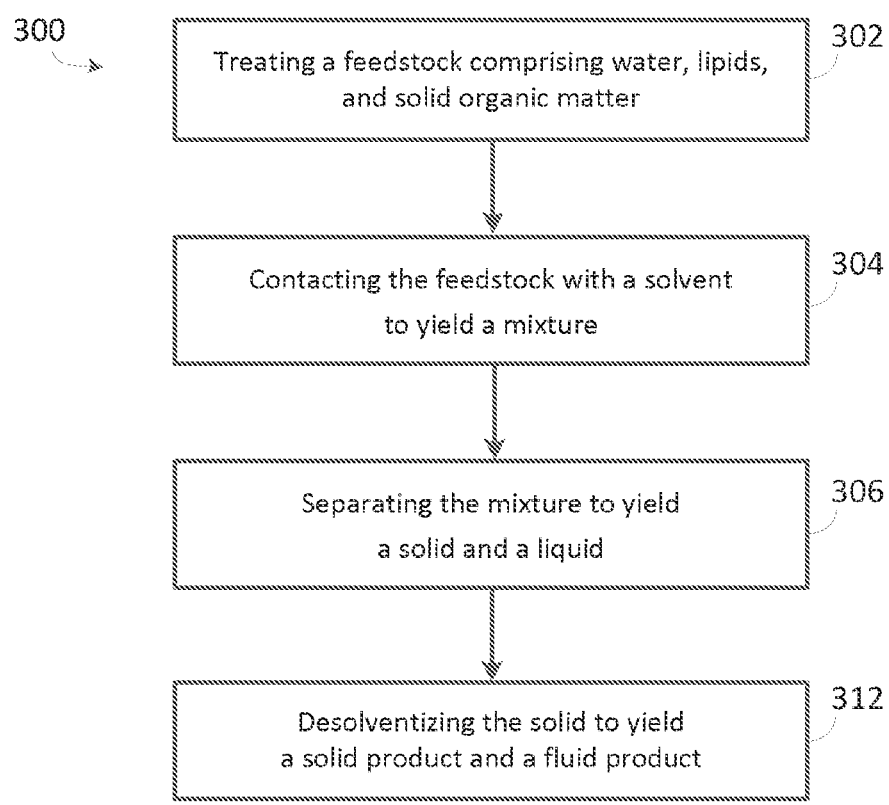
FIG. 3 depicts a third process for extracting lipids from a feedstock.

FIG. 3 depicts a process 300 for extracting lipids from a feedstock including water, lipids, and solid organic matter. Process 300 is an example of a process in which two or more operations in process 100 are omitted. Operations 302, 304, and 306 in process 300 correspond to operations 102, 104, and 106 of process 100, respectively, and operation 312 corresponds to operation 112 of process 100. Operations 304 and 306 may be combined in a continuous process that takes place in a single apparatus (e.g., an extractor) and may be achieved without the use of a centrifuge or a screen. In some cases, 304 and 306 occur simultaneously in the same apparatus. In one example, a suitable apparatus is the apparatus described with respect to operation 209.

A number of embodiments have been described. Nevertheless, it will be understood that various modifications may be made without departing from the spirit and scope of the disclosure. Accordingly, other embodiments are within the scope of the following claims.

What is claimed is:

1. A method of extracting lipids from a feedstock, the method comprising:
contacting a feedstock comprising water, lipids, and solid organic matter with an organic solvent to yield a mixture, wherein a number-weighted particle size distribution of the solid organic matter in the feedstock has a mean dimension in a range between 0.5 µm and 100 µm, and the lipids in the mixture are in the liquid state;
separating the mixture to yield a solid and a liquid, wherein the liquid comprises some of the lipids; and
desolventizing the solid to yield a solid product and a fluid product, wherein the solid product has a lipids content of 20 wt % or less.

2. The method of claim 1, wherein separating the mixture comprises subjecting the mixture to a rotational force produced by a centripetal acceleration of at least 2000 g.

3. The method of claim 1, wherein the fluid product is a vapor.

4. The method of claim 1, further comprising combining the fluid product with the liquid to yield a solvent mixture.

5. The method of claim 4, further comprising combining the solvent mixture with the feedstock.

6. The method of claim 4, wherein the fluid product, the liquid, or both comprise some of the lipids, and further comprising recovering at least some of the lipids from the fluid product, the liquid, or both.

7. The method of claim 1, further comprising combining additional lipids with the feedstock before contacting the feedstock with the organic solvent.

8. The method of claim 1, further comprising combining additional lipids with the mixture before separating the mixture.

9. The method of claim 1, wherein the solid product has a lipids content of 10 wt % or less.

10. The method of claim 1, wherein the number-weighted particle size distribution of the solid organic matter in the feedstock has a mean maximum dimension in a range between 0.5 μm and 100 μm.

11. The method of claim 1, wherein the number-weighted particle size distribution of the solid product has a mean maximum dimension in a range between 0.5 μm and 100 μm.

12. The method of claim 1, wherein the water content of the feedstock is up to 10 wt %.

13. The method of claim 1, wherein the lipids content of the feedstock is at least 20 wt %.

14. The method of claim 1, wherein the solid organic matter comprises solid animal matter, solid plant matter, algae, or a combination thereof.

15. The method of claim 1, wherein the organic solvent comprises one or more alkanes.

16. The method of claim 1, wherein the ratio of the mass of the organic solvent to the mass of the feedstock is in a range of 1:1 to 5:1.

17. The method of claim 1, further comprising treating the feedstock before contacting the feedstock with the organic solvent, wherein treating the feedstock comprises removing water from the feedstock to reduce a water content of the feedstock to less than 10 wt %.

18. The method of claim 1, further comprising treating the mixture before separating the mixture, wherein treating the mixture comprises heating the mixture to a temperature of at least 120° F. (50° C.) or 150° F. (65° C.), thereby killing bacteria in the mixture.

19. The method of claim 18, wherein the bacteria comprise bacteria of the genus *Salmonella*.

20. The method of claim 1, further comprising, before desolventizing the solid:

contacting the solid with a second organic solvent to yield a second mixture;
separating the second mixture to yield a second solid and a second liquid; and
desolventizing the second solid to yield the solid product and the fluid product.

21. The method of claim 1, wherein desolventizing the solid comprises drying the solid.

22. A method comprising:

contacting a feedstock comprising water, lipids, and solid organic matter with an organic solvent to yield a mixture, wherein the number-weighted particle size distribution of the solid organic matter in the feedstock has a mean dimension in a range between 0.5 μm and 100 μm, the lipids content of the feedstock is at least 10 wt %, the water content of the feedstock is up to 10 wt %, and the lipids in the mixture are in the liquid state;
separating the mixture to yield a solid and a liquid, wherein the liquid comprises some of the lipids; and
desolventizing the solid to yield a solid product and a fluid product, wherein the solid product has a lipids content of 20 wt % or less.

23. The method of claim 22, further comprising treating the feedstock before contacting the feedstock with the organic solvent, wherein treating the feedstock comprises removing water from the feedstock to reduce a water content of the feedstock to a range of 5 wt % to 10 wt %.

24. The method of claim 1, wherein contacting the feedstock, separating the mixture, and desolventizing the solid occur continuously.

25. The method of claim 12, wherein the water content of the feedstock is in a range of 5 wt % to 10 wt %.

26. The method of claim 15, wherein the organic solvent comprises n-hexane.

27. The method of claim 16, wherein the ratio of the mass of the organic solvent to the mass of the feedstock is in a range of 1.5:1 to 2.5:1.

28. The method of claim 22, wherein contacting the feedstock, separating the mixture, and desolventizing the solid occur continuously.

29. The method of claim 22, wherein the organic solvent comprises n-hexane.

30. The method of claim 22, wherein a ratio of the mass of the organic solvent to the mass of the feedstock is in a range of 1.5:1 to 2.5:1.

* * * * *